United States Patent
Myers

(10) Patent No.: US 12,454,089 B2
(45) Date of Patent: Oct. 28, 2025

(54) NO SOLID BED EXTRUDER SCREW WITH VARYING WIDTH SUB-CHANNELS

(71) Applicant: Jeffrey A. Myers, Onsted, MI (US)

(72) Inventor: Jeffrey A. Myers, Onsted, MI (US)

(*) Notice: Subject to any disclaimer, the term of this patent is extended or adjusted under 35 U.S.C. 154(b) by 777 days.

(21) Appl. No.: 17/664,442

(22) Filed: May 23, 2022

(65) Prior Publication Data

US 2023/0373150 A1 Nov. 23, 2023

(51) Int. Cl.
*B29C 48/53* (2019.01)
*B29C 48/505* (2019.01)
*B29C 48/535* (2019.01)
*B29C 48/62* (2019.01)

(52) U.S. Cl.
CPC ............ *B29C 48/53* (2019.02); *B29C 48/507* (2019.02); *B29C 48/535* (2019.02); *B29C 48/62* (2019.02)

(58) Field of Classification Search
CPC .................. B01F 7/086; B01F 7/00416; B01F 2215/0049; B01F 2215/0422; B01F 27/724; B01F 27/1143; B01F 2101/2805; B29C 48/45; B29C 48/565; B29C 48/687; B29C 48/53; B29C 48/507; B29C 48/535; B29C 48/62; B29C 48/509; B29C 48/65; B29B 7/421; B29B 7/423; B29B 7/429; B29B 7/428; B29B 7/523; B29B 7/422; B29B 7/425; B29B 7/426
USPC ...................................................... 366/80–81
See application file for complete search history.

(56) References Cited

U.S. PATENT DOCUMENTS

| | | | |
|---|---|---|---|
| 3,358,327 A | 12/1967 | Maillefer | |
| 3,487,503 A | 1/1970 | Barr et al. | |
| 3,632,255 A | 1/1972 | Geyer | |
| 4,075,712 A | 2/1978 | Geyer | |
| 4,277,182 A * | 7/1981 | Kruder | B29C 48/65 366/89 |
| 4,356,140 A * | 10/1982 | Kruder | B29C 48/65 264/211.23 |
| 4,405,239 A | 9/1983 | Chung et al. | |
| 4,896,969 A * | 1/1990 | Dray | B29B 7/429 366/322 |

(Continued)

FOREIGN PATENT DOCUMENTS

| | | |
|---|---|---|
| CN | 204526092 U | 8/2015 |
| CN | 208529690 U | 2/2019 |

(Continued)

*Primary Examiner* — Charles Cooley
(74) *Attorney, Agent, or Firm* — William J. Clemens; Shumaker, Loop & Kendrick, LLP

(57) ABSTRACT

A no solid bed extruder screw for processing a material to a molten state has a body with a helical thread having pushing and trailing surfaces, the body extending longitudinally between feed and discharge ends. A channel for receiving the material to be processed is formed between the body outer surface and an outer diameter of the thread bounded by the pushing surface and the trailing surface. A volume of the channel decreases in a plurality of revolutions of the thread in a direction from the feed end to the discharge end. A channel depth between the pushing surface and the trailing surface decreases for a first portion of the channel toward the feed end and increases for a second portion of the channel toward the discharge end. At least one of the channel portions has a constant width and includes varying width sub-channels.

19 Claims, 5 Drawing Sheets

(56) References Cited

U.S. PATENT DOCUMENTS

| | | | | | |
|---|---|---|---|---|---|
| 4,925,313 | A | * | 5/1990 | Nunn | B29B 7/429 |
| | | | | | 425/208 |
| 5,035,509 | A | * | 7/1991 | Kruder | B29C 48/62 |
| | | | | | 366/89 |
| 5,219,590 | A | * | 6/1993 | Kruder | B29C 48/53 |
| | | | | | 366/89 |
| 5,599,097 | A | * | 2/1997 | Christie | B29C 48/535 |
| | | | | | 366/89 |
| 6,056,430 | A | * | 5/2000 | Medici, Jr. | B29C 48/53 |
| | | | | | 366/89 |
| 6,132,075 | A | * | 10/2000 | Medici, Jr. | B29C 48/66 |
| | | | | | 366/89 |
| 6,139,179 | A | * | 10/2000 | Christiano | B29C 48/65 |
| | | | | | 366/89 |
| 6,176,606 | B1 | * | 1/2001 | Thompson | B29C 48/65 |
| | | | | | 366/89 |
| 6,179,461 | B1 | * | 1/2001 | Christiano | B29C 48/535 |
| | | | | | 366/89 |
| 6,599,004 | B2 | | 7/2003 | Barr | |
| 11,285,652 | B2 | | 3/2022 | Barr | |
| 12,304,125 | B2 | * | 5/2025 | Schierl | B29C 48/61 |
| 2023/0373150 | A1 | * | 11/2023 | Myers | B29C 48/535 |

FOREIGN PATENT DOCUMENTS

| | | | | | |
|---|---|---|---|---|---|
| DE | 102007000510 | A1 | | 4/2009 | |
| DE | 102020111510 | A1 | * | 10/2021 | B29B 7/425 |
| EP | 0456230 | A1 | * | 11/1991 | |
| GB | 1359672 | A | | 7/1974 | |
| JP | 55059943 | A | * | 5/1980 | B29C 47/60 |
| JP | 05138704 | A | * | 6/1993 | B29C 47/60 |
| JP | 2000176995 | A | * | 6/2000 | B29C 47/6043 |
| WO | WO-8606325 | A1 | * | 11/1986 | |

\* cited by examiner

NO SOLID BED EXTRUDER SCREW WITH VARYING WIDTH SUB-CHANNELS

FIELD OF THE INVENTION

The present technology relates to an extruder screw, including an extruder screw configured to maximize heat transfer to particles of solid material extruded thereby and minimize solids wedging.

BACKGROUND OF THE INVENTION

This section provides background information related to the present disclosure which is not necessarily prior art.

Extruder screws are used for transforming solid materials into a molten mixture for subsequent use in a mold or die via extrusion or injection. Materials that are used for this purpose include a range of plastic materials, as well as various metal or thixotropic materials. An extruder screw can have a generally cylindrical body or root with at least one helical thread or flight formed thereon. The outer diameter of the helical thread can be referred to as the main diameter of the screw, the area of the body between revolutions of the helical thread can be referred to as a channel of the screw, where a channel depth at given point can be defined as a difference between a diameter of the body at the given point and the main diameter. For a given revolution of the helical thread, the thread can define a pushing surface and a trailing surface bounding the channel, where revolution of the screw advances material in a direction from the pushing surface toward the trailing surface. In some screw designs, two channels of different depths can be formed between one or more revolutions of the primary helical thread defining the main diameter of the screw, where a secondary or barrier thread can form a barrier between the two channels. The screw can be disposed in a cylindrical barrel and a small clearance can exist between the main diameter of the screw and the interior wall forming the barrel. The barrel can be heated in order to conduct heat to the solid material contacting the barrel as the solid material progresses through the channels to promote melting of the solid material.

Extruder screws can include a feed section, a transition or compression section, an optional mixing section, and a metering section. The feed section can be formed at a feed end of the screw where the solid material is first introduced into the channels of the screw. The feed section of the screw can have a substantially constant channel depth that is relatively larger than the depth of the channels formed in the transition section or the metering section. The transition section of the screw can have the one or more channels formed between each turn of the primary helical thread gradually decreasing in depth as the screw extends in a direction from the feed end thereof to a discharge end thereof. Accordingly, the transition section can have an increasing outer diameter of the body of the screw to give the transition section of the screw a substantially conical or tapered appearance. The mixing section can include multiple channels of different depths separated by one or more barrier threads, where the channels can be formed between one or more revolutions of the primary helical thread. The metering section of the screw can have a substantially constant channel depth that is relatively smaller than the depth of the channel formed in the feed section.

Since the late 1950s, due to work by Bruce Maddock of Union Carbide, the solid bed theory of melting has dominated extruder screw design. Subsequent improvements in screw design have been based upon this theory. Although the theory is now taken as fact, as proven by numerous experiments and by melting equations developed by Tadmore and Klein in the 1960s, the solid bed theory may not be the only way of melting plastic in an extruder screw. The natural behavior of the unmelted plastic, entering the extruder screw from the feed hopper and conveyed forward by the helical thread, can be formed by channel depth reduction into a solid mass of unmelted plastic no matter the original solid material feed form (e.g., pellet, powder, or regrind). This solid mass of material is referred to as a solid bed. As this solid bed is forwarded down the screw channel transition section, the channel depth reduction causes the solid bed to be forced into pressurized contact with the extruder barrel, forcing melting to occur at the barrel/solid bed interface due to the energy of shear stress in the melt film. By the forwarding action of the helical thread, the melt can then be scrapped from the barrel surface by the trailing surface of the thread forcing it into a developing melt pool at the rear of the solid bed. Since the solid bed itself can take the form of a tightly compacted mass, no mixing of the plastic in the solid bed can occur. In addition, at the end of the channel depth taper, the remaining solid bed can exert very high pressures in the channels. This pressure can result in high screw thread wear—a phenomena known as "solids wedging." Further downstream, since the channel depth remains constant and thus no further compression can occur, the solid bed can break up into solid particles that float within the melt stream.

Most screw design developments to date have been aimed at completing the melting and mixing of the remaining solids to ensure a uniform melt exiting the extruder. Some designers, such as Maillefer and Barr, have controlled the solid bed by using a barrier thread or flight in the screw channel. This can be at a different lead than the main helical thread thus forcing the solid bed to be reduced in width as it moves down the screw channel, as per the Maillefer design (U.S. Pat. No. 3,358,327), or by using a same lead of the barrier thread between the solids and melt channels but reducing the solids channel depth to force the solid bed onto the barrel surface, as per the Barr design (U.S. Pat. No. 3,487,503). Variations of these concepts have been created over the last almost 60 years, but all still rely on the solid bed theory of melting the solid material.

Barr's later patent (U.S. Pat. No. 4,405,239), called the ET screw, proposed improved melting of the remaining solid bed, at the end of the tapered or transition section of the screw, by shuffling the melt/solid mix back and forth between adjacent channels over a barrier thread to improve conductive melting of the remaining solids. This design has proven successful as has its successor, the VBET screw (U.S. Pat. No. 6,599,004 also to Barr). Such designs ensure that no stationary melt film can exist around the remaining solid particles, thus improving the heat transfer from melt to solid.

One continuing problem is that the solid bed mass, in solid bed melting, is only exposed to heat input from its four sides within the channel; i.e., barrel surface, melt pool, screw body surface, and forward thread surface. Accordingly, it would be advantageous to provide a way to ensure that the solid material (e.g., pellet, powder, regrind) is surrounded by melted polymer. This would allow for maximizing heat transfer into the relatively small solid material particles. If such melting can be initiated as soon as there is a melt film on the barrel, then the solid bed may not be able to form. Screw thread wear could therefore be minimized as any "solids wedging" is thereby reduced or substantially eliminated.

U.S. Pat. No. 11,285,652 discloses extruder screws having a feed end and a discharge end and can be used in a single screw extruder, which extruder houses the extruder screw rotatably in a cylindrical barrel for processing a material to a molten state. Such extruder screws include a body, a helical thread formed on the body, and a channel for receiving the material to be processed. The body extends longitudinally between the feed end and the discharge end. The helical thread has a pushing surface and a trailing surface. The channel is defined between the outer surface of the body and the outer diameter of the helical thread bounded by the pushing surface and the trailing surface of the helical thread. In a transition or melting section of the screw, just after the feed section, a volume of the channel decreases over a plurality of revolutions of the helical thread in a direction from the feed end to the discharge end. Each revolution of the thread defines a separate channel portion. In one embodiment, starting at the feed end, a first part of successive channel portions is increased in depth and then decreased in depth, while a second part is decreased in depth and then increased in depth. In another embodiment, starting at the feed end, channel portions having a decreasing inclined depth, a constant depth and an increasing inclined depth are provided.

U.S. Pat. No. 11,285,652 describes a changing screw channel depth profile to keep solid particles of processed material moving back and forth in the channel. This can be accomplished by having two, or more, channel depth profiles between the helical threads of the screw. A volume of the screw channel can be gradually reduced from the feed end of the screw transition section to the end of melting determined by a chosen compression ratio. With approximately each revolution of the helical thread or turn of the screw from the inlet, the forward portion of the channel depth, near the tailing surface of the helical thread, can be reduced while the rear portion of the channel depth, near the pushing surface of the helical thread, can be increased. The feed material can therefore be shuffled from the front to the back of the channel and then in a subsequent revolution of the helical thread, the action can be reversed forcing the particles to move into the forward portion of the channel. This shuffling action minimizes the formation of a solid bed of material and also allows the melt from the barrel surface to be mixed into any remaining solid particles, further promoting melting. Absence of a barrier thread in the transition section where melting occurs allows free movement of any solid particles from the forward channel portion to the rear and vice versa. The channel profile can also be configured to taper the channel depth from one side of the channel to the other.

BRIEF SUMMARY OF THE INVENTION

The present technology includes articles of manufacture, systems, and processes that relate to an extruder screw and uses thereof that improve melting of extruded material.

In a first aspect of the invention, an extruder screw with a feed end spaced from a discharge end for use in a material extruder for processing a material to a molten state comprises: a body extending along a longitudinal axis between the feed end and the discharge end, the body having an outer surface and including a transition section; a helical thread formed on the body, the helical thread having a pushing surface and a trailing surface; a channel for receiving the material to be processed, the channel defined by the outer surface of the body and an outer diameter of the helical thread bounded by the pushing surface and the trailing surface of the helical thread; wherein the channel in the transition section has a first sub-channel meeting a second sub-channel at a junction, the first sub-channel being closer to the feed end than the second sub-channel across a width of the channel; wherein the first sub-channel increases in width from a starting point in the channel to an ending point in the channel, the ending point being closer to the discharge end than the starting point; and wherein the second sub-channel decreases in width from the starting point to the ending point.

The ending point is a first ending point, wherein the first sub-channel decreases in width from the first ending point to a second ending point in the channel closer to the discharge end than the first ending point; and wherein the second sub-channel increases in width from the first ending point to the second ending point. The width of the channel is constant between the starting point and the second ending point. The starting point and the second ending point delimit a channel portion of the transition section and at least another of the channel portion is formed in the transition section. The channel portions can have different leads.

The channel depth of the first sub-channel either increases or decreases between the starting point and the second ending point. The channel depth of the second sub-channel either increases or decreases between the starting point and the second ending point. The volume of the channel in the transition section decreases in a plurality of revolutions of the helical thread from the feed end to the discharge end. The channel in the transition section does not have a barrier thread.

The junction can be formed as a stepwise transition point. The first sub-channel and the second sub-channel extend at different angles of inclination relative to the longitudinal axis and the junction can be an inclination transition point.

According to a second aspect of the invention, the extruder screw according to the first aspect further comprises: wherein the starting point and the second ending point delimit a channel portion of the channel in the transition section, the transition section including the first sub-channel and the second sub-channel formed by a plurality of the channel portion; wherein a volume of the channel in the transition section decreases in a plurality of revolutions of the helical thread in a direction from the feed end to the discharge end; a first of the channel portions has the first sub-channel with a first depth and the second sub-channel with a second depth that is less than the first depth; a second of the channel portions has the first sub-channel with a third depth that is less than the second depth and the second sub-channel with a fourth depth that is greater than the second depth, the first channel portion being closer to the feed end than the second channel portion; a third of the channel portions is positioned between the first channel portion and the second channel portion, the third channel portion having the first sub-channel of a fifth depth that is equal to the first depth and the second sub-channel of a sixth depth that is equal to the third depth; and a fourth of the channel portions positioned between the third channel portion and the second channel portion, the fourth channel portion having the first sub-channel of a seventh depth that is between the first depth and the second depth and the second sub-channel of an eighth depth that is between the second depth and the sixth depth.

The first through fourth channel portions do not include a barrier thread. The extruder screw includes a stepwise transition point between at least one of: the first depth and the second depth; the third depth and the fourth depth; the fifth depth and the sixth depth; and the seventh depth and the eighth depth. The depth of the channel decreases along an inclined surface of the body transverse to the longitudinal direction in the first channel portion and the depth of the channel increases along an inclined surface of the body transverse to the longitudinal direction in the second channel portion.

According to a third aspect of the invention, the extruder screw according to the first aspect further comprises: wherein the starting point and the second ending point delimit a channel portion of the channel in the transition section, the transition section including the first sub-channel and the second sub-channel formed by a plurality of the channel portion; wherein a volume of the channel in the transition section decreases in a plurality of revolutions of the helical thread in a direction from the feed end to the discharge end; a first of the channel portions having the first sub-channel with a first depth and the second sub-channel with a second depth that is less than the first depth and including a stepwise transition point between the first depth and the second depth; a second of the channel portions having the first sub-channel with a third depth that is less than the second depth and the second sub-channel with a fourth depth that is greater than the second depth and including a stepwise transition point between the third depth and the fourth depth, the first channel portion being closer to the feed end than the second channel portion; a third of the channel portions positioned between the first channel portion and the second channel portion, the third channel portion having the first sub-channel of a fifth depth that is equal to the first depth and the second sub-channel of a sixth depth that is equal to the third depth and including a stepwise transition point between the fifth depth and the sixth depth; and a fourth of the channel portions positioned between the third channel portion and the second channel portion, the fourth channel portion having a rearward part of a seventh depth that is between the first depth and the second depth and a forward part of an eighth depth that is between the second depth and the sixth depth and including a stepwise transition point between the seventh depth and the eighth depth, whereby solid particles of material in the fourth channel are moved toward the discharge end as the body is rotated.

The extruder screw includes each of the stepwise transition points being formed at a junction of the first sub-channel and the second sub-channel.

According to a fourth aspect of the invention, the extruder screw according to the first aspect further comprises: wherein the starting point and the second ending point delimit a channel portion of the channel in the transition section; wherein a volume of the channel in the transition section decreases in a plurality of revolutions of the helical thread in a direction from the feed end to the discharge end; and wherein the first sub-channel has a surface inclined at a predetermined first angle relative to the longitudinal axis and the second sub-channel has a surface inclined at a predetermined second angle relative to the longitudinal axis, the first angle being different than second angle.

Further areas of applicability will become apparent from the description provided herein. The description and specific examples in this summary are intended for purposes of illustration only and are not intended to limit the scope of the present disclosure. Further advantages, features, and details of the invention can be found in the following description of embodiments and with reference to the drawings, in which identical or functionally identical elements are provided with identical reference signs. The drawings are merely schematic and are not to scale.

BRIEF DESCRIPTION OF THE SEVERAL VIEWS OF THE DRAWING

The drawings described herein are for illustrative purposes only of selected embodiments and not all possible implementations, and are not intended to limit the scope of the present disclosure.

DETAILED DESCRIPTION OF THE INVENTION

Figure 1:
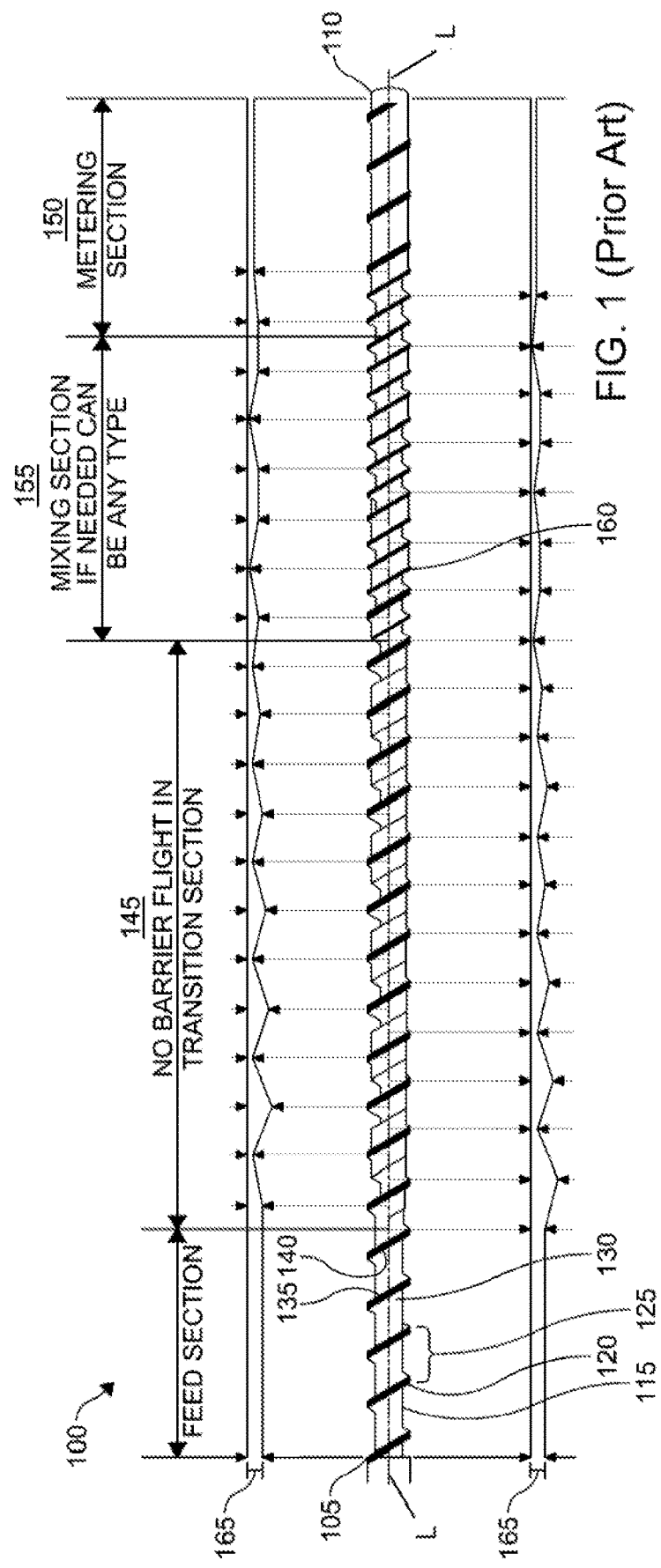
FIG. 1 is a fragmentary schematic view of the prior art extruder screw described in the U.S. Pat. No. 11,285,652.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides ways to surround solid material (e.g., pellet, powder, regrind) with melted polymer during extrusion to maximize heat transfer to the solid material particles. Initiation of such melting as a melt film develops on an extruder barrel can minimize the formation of a solid bed and progression of such down the extruder channel. Screw thread wear can accordingly be minimized as effects of "solids wedging" are reduced or substantially eliminated. To this end, an extruder screw is provided that has a feed end and discharge end for use in a single screw extruder that houses the extruder screw rotatably in a cylindrical barrel for processing a material to a molten state. The extruder screw includes a body extending longitudinally between the feed end and the discharge end, a helical thread formed on the body, and a channel for receiving the material to be processed. The channel is defined by an outer surface of the body bounded by a pushing surface and a trailing surface of the helical thread. A volume of a first portion of the channel decreases in a plurality of revolutions of the helical thread in a direction from the feed end to the discharge end. A channel depth between the pushing surface and the trailing surface decreases for a first channel length in the first portion of the channel and the channel depth between the pushing surface and the trailing surface increases for a second channel length in the first portion of the channel.

In an extruder screw, the present technology can therefore minimize or substantially eliminate the solid bed method of melting. In a transition section (also known as a melting or compression section) of the screw, after the feed end, the screw channel can be configured to have a changing channel depth; e.g., the channel depth running between the pushing and trailing surfaces of the helical thread can be divided into two sections of different depths. The channel depths can be varied from shallow to deep within at least one revolution of the helical thread of the screw. A forward section of the channel toward the trailing surface of the helical thread starts from a feed depth that becomes shallower while a rear section of the channel toward the pushing surface of the helical thread becomes deeper, thus causing material particles to flow from the front section to the rear section until the front section reaches almost to a clearance of the helical thread of the extruder screw, while the rear section depth increases to accommodate material particles being forced into it by a reducing depth of the forward section. At this point, the channel depth geometry can be reversed with the rear section becoming shallower as the forward section becomes deeper to accommodate a forward flow of plastic into the forward section. This geometry can be continued until the end of the transition section. The total volume of the channel in the screw between the helical thread is reduced over the length of the transition section to accommodate the reduced volume of material, or compression, due to melting. This repeated shuffling of the material from the front section to the rear section prevents the formation of a solid bed of material while melting occurs by shear heating of the material against the inner surface of the extruder barrel and by conduction of heat from the melted material into the remaining solid particles of material.

The outer surface of the body of the extruder screw can also employ a tapered or inclined surface to provide the change in channel depth running between the pushing and trailing surfaces of the helical thread in order to move solid particles between the forward section and the rear section of the channel. The direction of the tapered or inclined surface can be reversed in one or more subsequent or further revolutions of the helical thread to accordingly reverse the movement direction of any solid material particles. It is also possible to combine stepwise changes and continuous changes in channel depths running between the pushing and trailing surfaces of the helical thread.

Extruder screws and uses thereof can further include the following aspects. In certain embodiments, the first portion of the channel does not include a barrier thread. For example, as the volume of the first portion of the channel can decrease in a plurality of revolutions of the helical thread in a direction from the feed end to the discharge end, the first portion of the channel can be all or part of a transition section of the extruder screw. The extruder screw can include a transition section as well as a metering section, where as noted, the first portion of the channel can be in the transition section. The extruder screw can also include a mixing section located between the transition section and the metering section. The mixing section can include one or more barrier threads positioned between the pushing surface and the trailing surface of the helical thread. The barrier thread can have an outer diameter that is less than or equal to the outer diameter of the helical thread; e.g., the main diameter of the extruder screw.

Various transitions between channel lengths having various channel depth profiles can be employed. In some embodiments, the first channel length can directly transition to the second channel length. A third channel length can also separate the first channel length and the second channel length in the first portion of the channel. The channel depth between the pushing surface and the trailing surface for the third channel length can be substantially constant. The first channel length can embody various numbers of helical thread revolutions and/or fractions thereof. For example, in certain embodiments the first channel length can include about two successive revolutions of the helical thread and in other embodiments the first channel length can include about three successive revolutions of the helical thread. Likewise, the second channel length can embody various numbers of helical thread revolutions and/or fractions thereof. In certain embodiments, the second channel length can include about one revolution of the helical thread.

Changes between channel depth between the pushing surface and the trailing surface of the helical thread can take various forms. The channel depth between the pushing surface and the trailing surface, for example, can exhibit a stepwise decrease for the first channel length. This stepwise decrease can occur at about a midpoint of the channel between the pushing surface and the trailing surface. Likewise, the channel depth between the pushing surface and the trailing surface can exhibit a stepwise increase for the second channel length. This stepwise increase can occur at about a midpoint of the channel between the pushing surface and the trailing surface. The channel depth between the pushing surface and the trailing surface can also exhibit a continuous decrease for the first channel length and/or the channel depth between the pushing surface and the trailing surface can exhibit a continuous increase for the second channel length. Combinations of various stepwise increases/decreases with continuous increases/decreases can also be employed.

The present technology further includes extruders including extruder screws as described herein, systems including such extruders, and where such extruders are used in conjunction with various dies and/or injection units. Certain embodiments include an extruder for processing a material to a molten state, where the extruder comprises one or more extruder screws as provided herein. Methods of extruding a material to a molten state are also contemplated that employ one or more extruders and/or extruder screws constructed in accordance with the present technology.

Example embodiments of the present technology are provided with reference to the several figures enclosed herewith.

Figure 2:
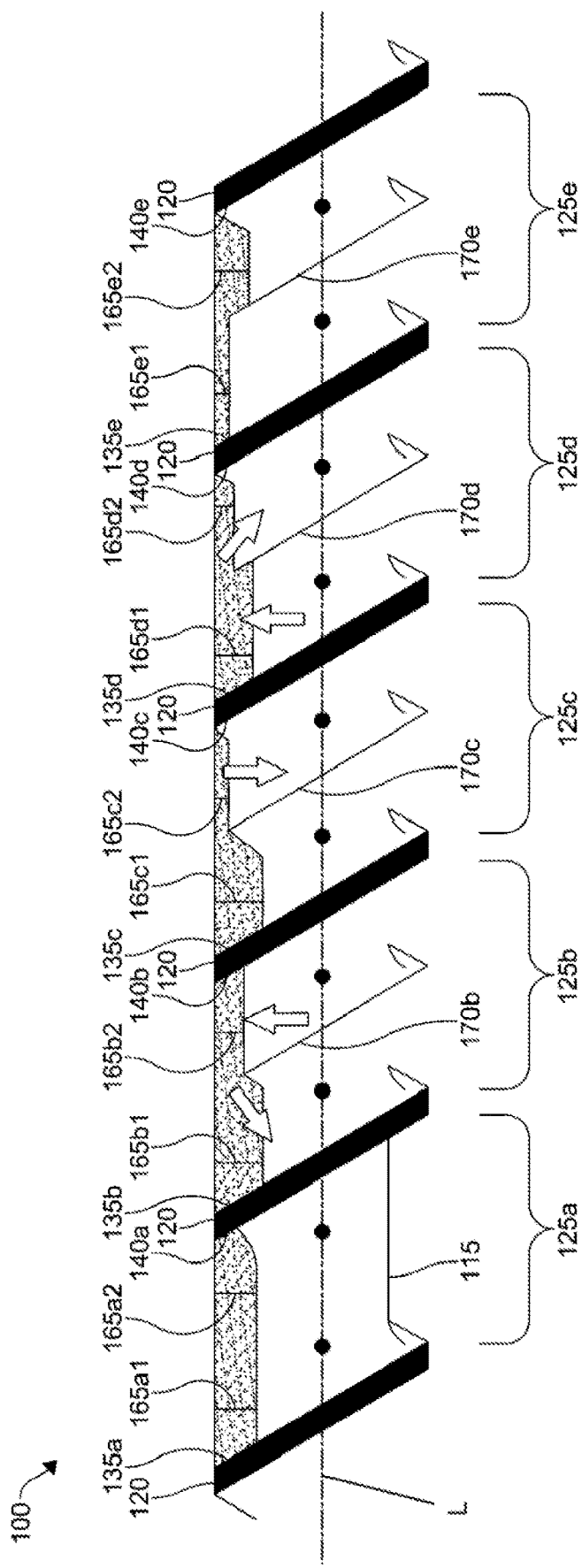
FIG. 2 is an enlarged fragmentary schematic view of an embodiment of a screw channel of the extruder screw of FIG. 1.
Figure 3:
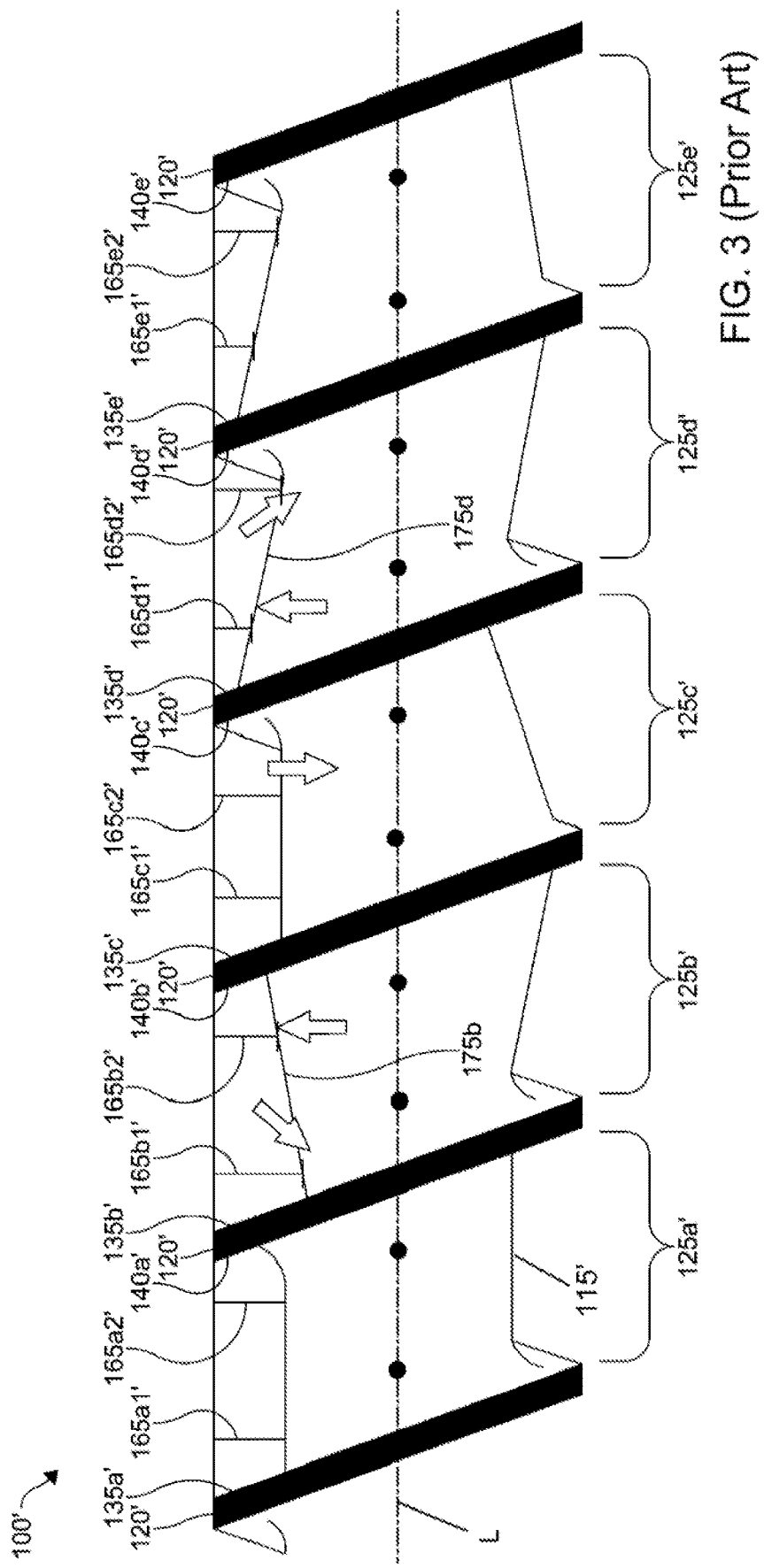
FIG. 3 is an enlarged fragmentary schematic view of another embodiment of a screw channel of the prior art extruder screw of FIG. 1.

FIGS. 1-3 depict the prior art extruder screw disclosed in U.S. Pat. No. 11,285,652 that is incorporated by reference. FIG. 1 shows an embodiment of an extruder screw 100 with a feed end 105 spaced from a discharge end 110 for use in a single screw extruder that houses the extruder screw 100 rotatably in a cylindrical barrel for processing a material to a molten state is shown. The extruder screw 100 includes a body 115 extending along a longitudinal axis L, a helical thread 120, and a channel 125. The body 115 extends longitudinally between the feed end 105 and the discharge end 110, where the body 115 has an outer surface 130. The helical thread 120 is formed on and extends radially outward from the body 115, where the helical thread 120 has a pushing surface 135 and a trailing surface 140. The channel 125 receives the material to be processed in a feed section and is defined by the outer surface 130 of the body 115 bounded by the pushing surface 135 and the trailing surface 140 of the helical thread 120. The extruder screw 100 includes a transition section 145 and a metering section 150, where a mixing section 155 is disposed therebetween. In the embodiment shown, the mixing section 155 includes a barrier thread 160 in the channel 125. However, the channel 125 within the transition section 145 of the extruder screw 100 lacks the barrier thread 160. The channel 125 has a varying depth 165.

With reference to FIG. 2, an enlarged fragmentary schematic view of the transition section 145 of the extruder screw 100 of FIG. 1 is shown. The channel 125 of FIG. 1 is defined by the outer surface 130 of the body 115 and the outer diameter of the helical thread 120 with portions each bounded by a pushing surface and a trailing surface of the helical thread 120. As depicted in FIG. 2, portions of the channel in the transition section are identified by reference numerals 125a, 125b, 125c, 125d, 125e from left to right with respective pushing surfaces 135a-e and trailing surfaces 140a-e. A volume of the channel portions 125a-e decreases in a plurality of revolutions of the helical thread 120 in a direction from the feed end 105 to the discharge end 110. A channel depth (165a1, 165a2) of the first channel portion 125a is constant. As shown, the volume of the channel decreases successively from the channel portion 125a to the channel portion 125b, from the channel portion 125b to the channel portion 125c, from the channel portion 125c to the channel portion 125d, and from the channel portion 125d to the channel portion 125e. The decreasing volume produces increasing compression and melting of material as it moves through the channel portions 125a-e. The channel depth adjacent to the pushing surfaces 135a-e increases (165a1, 165b1, 165c1) and then decreases (165d1, 165e1). The channel depth adjacent to the trailing surfaces 140a-e decreases (165a2, 165b2, 165c2) and then increases (165d2, 165e2). In particular, note how the channel depth decreases from 165b1 to 165b2 between the pushing surface 135b and the trailing surface 140b of the channel portion 125b, and how the channel depth decreases from 165c1 to 165c2 between the pushing surface 135c and the trailing surface 140c of the channel portion 125c. Also, note how the channel depth increases from 165e1 to 165e2 between the pushing surface 135e and the trailing surface 140e of the channel portion 125e.

The embodiment depicted in FIG. 2 shows certain ways to provide a decrease and an increase in channel depth between the pushing surface 135b-e and the trailing surface 140b-e of the channel portions. The channel depths 165b1, 165b2 and 165c1, 165c2 between the pushing surfaces 135b, 135c and the trailing surfaces 140b, 140c respectively exhibit a stepwise decrease for a first part of the channel portions 125b, 125c. In the channel portion 125b, the stepwise decrease is marked by a transition point 170b separating the channel depth 165b1 from the channel depth 165b2. In the channel portion 125c, the stepwise decrease is marked by a transition point 170c separating a rearward part with the channel depth 165c1 from a forward part with the channel depth 165c2. As shown in the embodiment depicted, the stepwise decreases at the transition points 170b, 170c occur at about midpoints of the channel portions 125b, 125c between the respective pushing surfaces 135b, 135c and trailing surfaces 140b, 140c. A similar depth decrease occurs in the channel portion 125d at a transition point 170d about midpoint between the surfaces 135d, 140d. Likewise, the channel depth 165e1, 165e2 between the pushing surface 135e and the trailing surface 140e exhibits a stepwise increase for the channel portion 125e. In the channel portion 125e, the stepwise decrease is marked by a transition point 170e separating a rearward part with the channel depth 165e1 from a forward part with the channel depth 165e2. As shown in the embodiment depicted, the stepwise increase at the transition point 170e occurs at about a midpoint of the channel portion 125e between the pushing surface 135e and the trailing surface 140e. The arrows in FIG. 2 depict how solid material is shuffled back and forth within the portions 125b, 125c, 125d of the channel in the transition section to maximize heat transfer to solid material particles, initiate melting, and minimize formation of a solid bed and progression of such down the extruder channel.

With reference to FIG. 3, an enlarged fragmentary schematic view of another embodiment of the transition section of an extruder screw 100' is shown, where features similar to those in FIGS. 1-2 are denoted by reference numerals appended with the prime symbol ('). The channel is defined by an outer surface 115' of the body and the outer diameter of the helical thread 120' bounded by the pushing surfaces 135a'-e' and the trailing surfaces 140a'-e' of the helical thread 120'. As depicted in FIG. 3, portions of the channel are identified by the reference numerals 125a', 125b', 125c', 125d', 125e'. A volume of the portions 125a'-e' decreases in a plurality of revolutions of the helical thread 120' in a direction from the feed end to the discharge end (left to right). As shown, the volume of the channel decreases successively from the channel portion 125a' to the channel portion 125b', from the channel portion 125b' to the channel portion 125c', from the channel portion 125c' to the channel portion 125d', and from the channel portion 125d' to the channel portion 125e'. The decreasing volume produces increasing compression and melting of material as it moves through the channel portions 125a'-e'. A channel depth 165b1', 165b2' between the pushing surface 135b' and the trailing surface 140b' decreases for an inclined length of the channel portion 125b'. The channel depth 165d1', 165d2' between the pushing surface 135d' and the trailing surface 140d' increases for an inclined length of the channel portion 125d'. The channel depth 165e1', 165e2' between the pushing surface 135e' and the trailing surface 140e' increases for an inclined length of the channel portion 125e'.

The embodiment shown in FIG. 3 also provides certain additional aspects. In particular, the channel portion 125c' separates the channel portion 125b' from the channel portion 125d'. The channel depth 165c1', 165c2' between the pushing surface 135c' and the trailing surface 140c' is substantially constant for the length of the channel portion 125c'. This is similar to the channel portion 125a' where the channel depth 165a1', 165a2' between the pushing surface 135a' and the trailing surface 140a' is substantially constant. The channel depth 165b1', 165b2' between the pushing surface 135b' and the trailing surface 140b' exhibits a continuous decrease over the length of the channel portion 125b'. The channel depth 165d1', 165d2' between the pushing surface 135d' and the trailing surface 140d' exhibits a continuous increase for the length of the channel length 125d'. The continuous decrease and the continuous increase in channel depths can be provided by respective tapered or inclined surfaces 175b, 175d. The arrows in FIG. 3 depict how solid material is shuffled back and forth within the channel portions 125b', 125c', 125d' to maximize heat transfer to solid material particles, initiate melting, and minimize formation of a solid bed and progression of such down the extruder channel.

Figure 4:
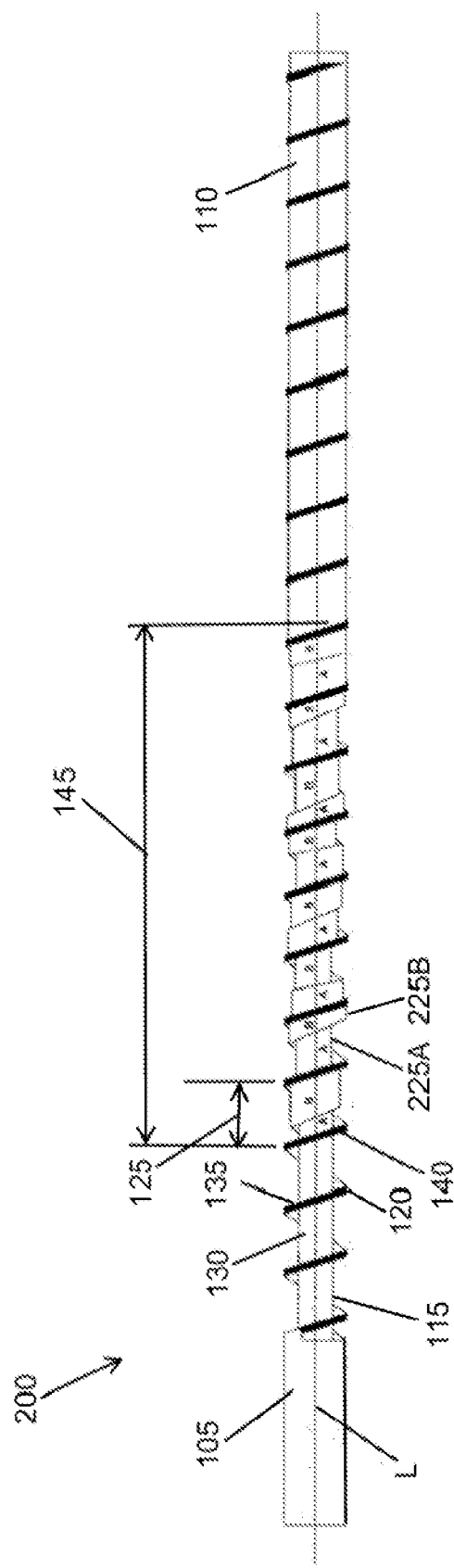
FIG. 4 is a fragmentary schematic view of an extruder screw according to the invention.
Figure 5:
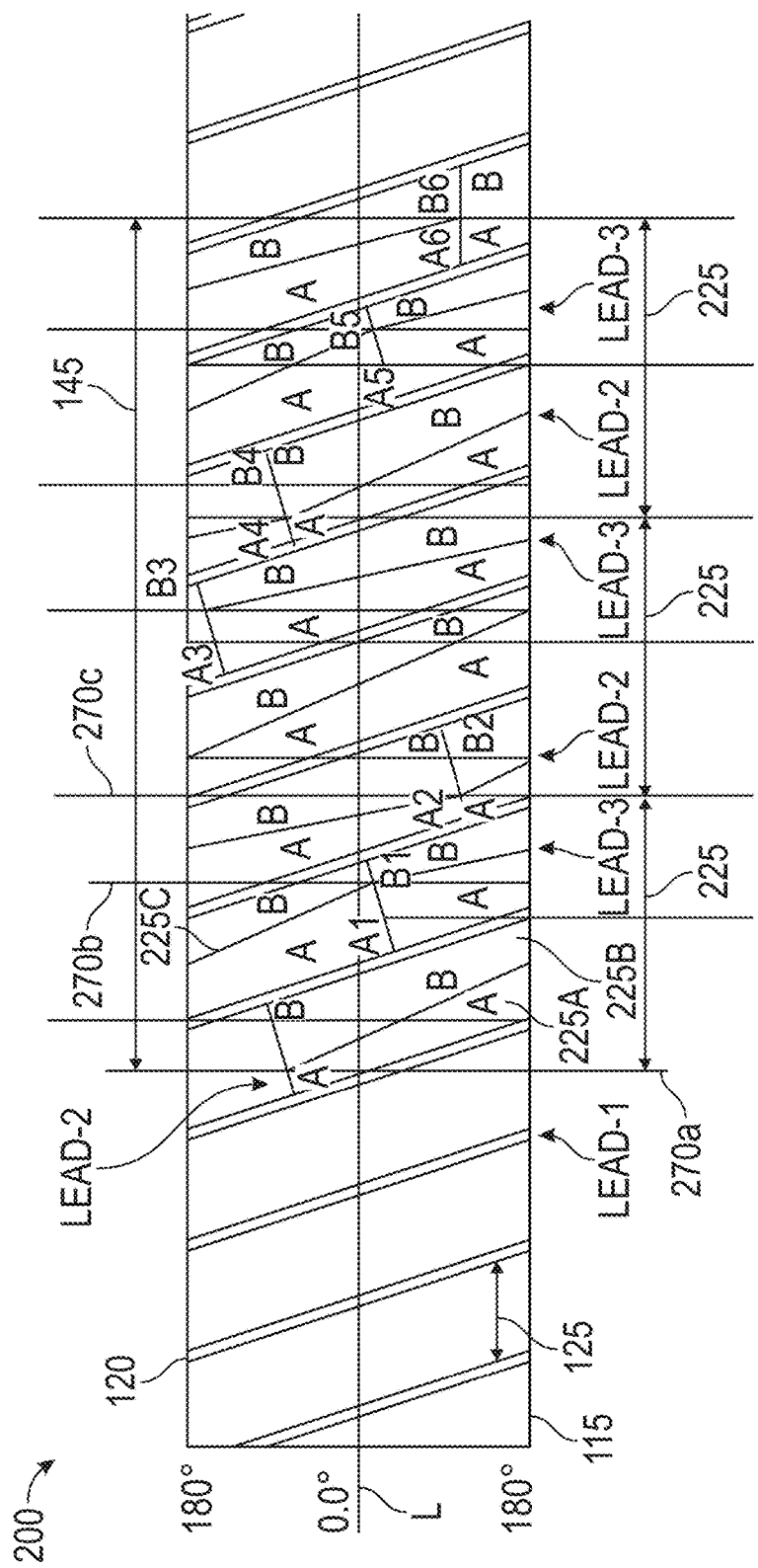
FIG. 5 is an enlarged fragmentary schematic view of a screw channel with sub-channels of the extruder screw of FIG. 4.

FIGS. 4 and 5 show an embodiment of an extruder screw 200 according to the invention. The screw 200 shown in FIG. 4 is similar to the screw 100 shown in FIG. 1 with a feed end 105 spaced from a discharge end 110 for use in a single screw extruder that houses the extruder screw 200 rotatably in a cylindrical barrel for processing a material to a molten state. The extruder screw 200 includes a body 115 extending along a longitudinal axis L, a helical thread 120, and a channel 125. The body 115 extends longitudinally between the feed end 105 and the discharge end 110, where the body 115 has an outer surface 130. The helical thread 120 is formed on and extends radially outward from the body 115, where the helical thread 120 has a pushing surface 135 and a trailing surface 140. The channel 125 receives the material to be processed in a feed section and is defined by the outer surface 130 of the body 115 bounded by the pushing surface 135 and the trailing surface 140 of the helical thread 120. The extruder screw 200 includes a transition section 145 wherein the channel 125 is separated into a first sub-channel 225A and an adjacent second sub-channel 225B. The sub-channels 225A and 225B meet at a junction 225C and have different depths across the channel 125 in the direction of the longitudinal axis L. Although two sub-channels are shown, the channel 125 can be divided into three or more sub-channels.

The channel 125 in the transition section 145 is shown in more detail in FIG. 5. The channel 125 in the transition section has the first sub-channel 225A adjacent to the second sub-channel 225B, wherein the first sub-channel is closer to the feed end 105 than the second sub-channel 225B across a width of the channel 125. The first sub-channel 225A increases in width from a starting point 270a in the channel 125 to a first ending point 270b in the channel, the first ending point 270b being closer to the discharge end 110 than the starting point 270a. The second sub-channel 225B decreases in width from the starting point 270a to the first ending point 270b. The first sub-channel 225A decreases in width from the first ending point 270*b* to a second ending point 270*c* in the channel 125 closer to the discharge end 110 than the first ending point 270*b*. The second sub-channel 225B increases in width from the first ending point 270*b* to the second ending point 270*c*. The width of the channel 125 is constant between the starting point 270*a* and the second ending point 270*c*.

The starting point 270*a* and the second ending point 270*c* delimit a channel portion 225 of the transition section 145. As shown in FIG. 5, three of the channel portion 225 are formed in the transition section 145 adjacent one another. However, any desired number of the channel portions 225 can be formed in the transition section 145. The channel 125 in the transition section 145 of the extruder screw 200 does not have a barrier thread such as the barrier thread 160 shown in FIG. 1. Further, the channel portions 225 do not have to be identical. For example, the widths of the sub-channels 225A and 225B in any of the channel portions 225 can differ from the sub-channel widths in any other one of the channel portions. The depths of the sub-channels 225A and 225B in any of the channel portions 225 can differ from the sub-channel depths in any other one of the channel portions. The length of any of the channel portions 225 can differ from the length any other one of the channel portions to create a "chaotic" material flow path to prevent a solid bed from forming. FIG. 5 illustrates an example wherein the channel portion 225 to the right is longer than the other two channel portions.

The junction 225C of the first sub-channel 225A with the second sub-channel 225B has two different leads or pitches in the channel portions 225. As shown in FIG. 5, the channel 125 is formed with a predetermined first lead LEAD-1 across the transition section 145. Between the starting point 270*a* and the first ending point 270*b* in the leftmost channel portion 225, the junction is formed with a second lead LEAD-2. Between the first ending point 270*b* and the second ending point 270*c*, the junction is formed with a third lead LEAD-3. Although FIG. 5 shows that the leads LEAD-2 and LEAD-3 are repeated in the following channel portions 225, the leads can be different in different channel portions.

Figure 6:
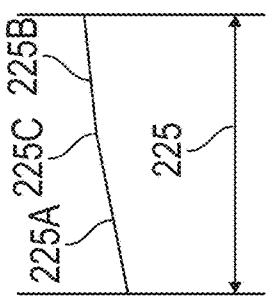
FIG. 6 is an enlarged fragmentary schematic view of the screw channel of FIG. 5 showing inclined surface sub-channels.

The channel portion 225 can be incorporated in the extruder screw 100 shown in FIGS. 1-3. For example, the sub-channels 225A and 225B can be formed in one or more of the channel portions 125*a* through 125*e*. The result is that the sub-channels 225A and 225B vary in width and depth to minimize the formation of a solid bed and progression of such down the extruder channel. Screw thread wear can accordingly be minimized as effects of "solids wedging" are reduced or substantially eliminated. The stepwise transition points 170*b-d* shown in FIG. 2 can be located at the junction 225C of the sub-channels 225A, 22B. In the alternative, the sub-channels 225A and 225B can have inclined surfaces that extend at different angles relative to the longitudinal axis of the screw and meet at an inclination transition point at the junction 225C as shown in FIG. 6. Each of the inclined surfaces can be inclined outwardly as is the surface 175*b* shown in FIG. 3 or can be inclined inwardly as is the surface 175*d* shown in FIG. 3. Furthermore, the inclined surfaces can be combined with the stepwise transition points.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

In accordance with the provisions of the patent statutes, the invention has been described in what is considered to represent its preferred embodiment. However, it should be noted that the invention can be practiced otherwise than as specifically illustrated and described without departing from its spirit or scope.

The invention claimed is:

1. An extruder screw with a feed end spaced from a discharge end for use in a material extruder for processing a material to a molten state, the extruder screw comprising:
a body extending along a longitudinal axis between the feed end and the discharge end, the body having an outer surface and including a transition section;
a helical thread formed on the body, the helical thread having a pushing surface and a trailing surface;
a channel for receiving the material to be processed, the channel defined by the outer surface of the body and an outer diameter of the helical thread bounded by the pushing surface and the trailing surface of the helical thread;
wherein the channel in the transition section has a first sub-channel meeting a second sub-channel at a junction, the first sub-channel being closer to the feed end than the second sub-channel across a width of the channel;
wherein the first sub-channel increases in width from a starting point in the channel to an ending point in the channel, the ending point being closer to the discharge end than the starting point;
wherein the second sub-channel decreases in width from the starting point to the ending point;
wherein the ending point is a first ending point, wherein the first sub-channel decreases in width from the first ending point to a second ending point in the channel closer to the discharge end than the first ending point; and
wherein the second sub-channel increases in width from the first ending point to the second ending point.

2. The extruder screw according to claim 1 wherein the width of the channel is constant between the starting point and the second ending point.

3. The extruder screw according to claim 1 wherein the starting point and the second ending point delimit a channel portion of the transition section and another of the channel portions is formed in the transition section.

4. The extruder screw according to claim 1 wherein the starting point and the second ending point delimit a channel portion of the transition section and three of the channel portions are formed in the transition section adjacent one another.

5. The extruder screw according to claim 4 wherein the width of the channel is constant in the transition section.

6. The extruder screw according to claim 1 wherein the starting point and the second ending point delimit a channel portion of the transition section and the transition section includes at least two of the channel portions having different leads.

7. The extruder screw according to claim 1 wherein a channel depth of the first sub-channel either increases or decreases between the starting point and the second ending point.

8. The extruder screw according to claim 1 wherein a channel depth of the second sub-channel either increases or decreases between the starting point and the second ending point.

9. The extruder screw according to claim 1 wherein a volume of the channel in the transition section decreases in a plurality of revolutions of the helical thread from the feed end to the discharge end.

10. The extruder screw according to claim 1 wherein the channel in the transition section does not have a barrier thread.

11. The extruder screw according to claim 1 wherein the junction is formed as a stepwise transition point.

12. The extruder screw according to claim 1 wherein the first sub-channel and the second sub-channel extend at different angles of inclination relative to the longitudinal axis and the junction is an inclination transition point.

13. The extruder screw according to claim 1 further comprising:
   wherein the starting point and the second ending point delimit a channel portion of the channel in the transition section, the transition section including the first sub-channel and the second sub-channel formed by a plurality of the channel portion;
   wherein a volume of the channel in the transition section decreases in a plurality of revolutions of the helical thread in a direction from the feed end to the discharge end;
   a first of the channel portions has the first sub-channel with a first depth and the second sub-channel with a second depth that is less than the first depth;
   a second of the channel portions has the first sub-channel with a third depth that is less than the second depth and the second sub-channel with a fourth depth that is greater than the second depth, the first channel portion being closer to the feed end than the second channel portion;
   a third of the channel portions is positioned between the first channel portion and the second channel portion, the third channel portion having the first sub-channel of a fifth depth that is equal to the first depth and the second sub-channel of a sixth depth that is equal to the third depth; and
   a fourth of the channel portions positioned between the third channel portion and the second channel portion, the fourth channel portion having the first sub-channel of a seventh depth that is between the first depth and the second depth and the second sub-channel of an eighth depth that is between the second depth and the sixth depth.

14. The extruder screw according to claim 13 wherein the first through fourth channel portions do not include a barrier thread.

15. The extruder screw according to claim 13 including a stepwise transition point between at least one of: the first depth and the second depth; the third depth and the fourth depth; the fifth depth and the sixth depth; and the seventh depth and the eighth depth.

16. The extruder screw according to claim 13 wherein the depth of the channel decreases along an inclined surface of the body transverse to the longitudinal direction in the first channel portion and the depth of the channel increases along an inclined surface of the body transverse to the longitudinal direction in the second channel portion.

17. The extruder screw according to claim 1 further comprising:
   wherein the starting point and the second ending point delimit a channel portion of the channel in the transition section, the transition section including the first sub-channel and the second sub-channel formed by a plurality of the channel portions;
   wherein a volume of the channel in the transition section decreases in a plurality of revolutions of the helical thread in a direction from the feed end to the discharge end;
   a first of the channel portions having the first sub-channel with a first depth and the second sub-channel with a second depth that is less than the first depth and including a stepwise transition point between the first depth and the second depth;
   a second of the channel portions having the first sub-channel with a third depth that is less than the second depth and the second sub-channel with a fourth depth that is greater than the second depth and including a stepwise transition point between the third depth and the fourth depth, the first channel portion being closer to the feed end than the second channel portion;
   a third of the channel portions positioned between the first channel portion and the second channel portion, the third channel portion having the first sub-channel of a fifth depth that is equal to the first depth and the second sub-channel of a sixth depth that is equal to the third depth and including a stepwise transition point between the fifth depth and the sixth depth; and
   a fourth of the channel portions positioned between the third channel portion and the second channel portion, the fourth channel portion having a rearward part of a seventh depth that is between the first depth and the second depth and a forward part of an eighth depth that is between the second depth and the sixth depth and including a stepwise transition point between the seventh depth and the eighth depth, whereby solid particles of material in the fourth channel are moved toward the discharge end as the body is rotated.

18. The extruder screw according to claim 17 wherein each of the stepwise transition points is formed at a junction of the first sub-channel and the second sub-channel.

19. The extruder screw according to claim 1 further comprising:
   wherein the starting point and the second ending point delimit a channel portion of the channel in the transition section;
   wherein a volume of the channel in the transition section decreases in a plurality of revolutions of the helical thread in a direction from the feed end to the discharge end; and
   wherein the first sub-channel has a surface inclined at a predetermined first angle relative to the longitudinal axis and the second sub-channel has a surface inclined at a predetermined second angle relative to the longitudinal axis, the first angle being different from second angle.

* * * * *